Patented Oct. 18, 1949

2,485,141

UNITED STATES PATENT OFFICE 2,485,141

AQUEOUS EMULSION POLYMERIZATION OF VINYL ACETATE

William R. Cornthwaite, Wilmington, Del., and Harold W. Bryant, Niagara Falls, N. Y., assignors to E. I. du Pont de Nemours & Company, Wilmington, Del., a corporation of Delaware No Drawing. Application January 16, 1946, Serial No. 641,657

9 Claims. (Cl. 260—89.1)

This invention relates to the production of polymers and, more particularly, it relates to the production of polymerized vinyl acetate by an aqueous emulsion or granular polymerization process to produce polymerized vinyl acetate having a relatively low viscosity.

Heretofore, when polymerized vinyl acetate was produced by the emulsion or granular polymerization of vinyl acetate, the resulting polyvinyl acetate had a relatively high viscosity. This was particularly true when the vinyl acetate was substantially completely polymerized (93% to 100% polymerized) by maintaining the polymerization reaction at reflux temperatures. When substantially completely polymerized by emulsion polymerization, the polyvinyl acetate had a viscosity ranging from about 1100 to 1800 centipoises for a solution of 86 grams of polymer in one liter benzene at 20° C. The production of such high viscosity polyvinyl acetate from vinyl acetate is peculiar to aqueous emulsion or granular polymerization processes and does not occur in processes involving solvent polymerization of vinyl acetate.

For many processes and uses, this relatively high viscosity of polyvinyl acetate is undesirable and objectionable. It is particularly objectionable when the polyvinyl acetate is to be hydrolyzed for the production of polyvinyl alcohol. More time is required to prepare solutions of this material. If the polyvinyl acetate is to be dissolved in a solvent preparatory to hydrolysis, the acetate must be kneaded for a considerable period of time to dissolve the same, thus requiring added time and power. The high viscosity of the polyvinyl acetate does not contribute toward increased viscosity of the polyvinyl alcohol produced therefrom but brings about the production of inferior polyvinyl alcohol with respect to particle size, insoluble particles, and bulk density.

It is, therefore, an object of this invention to provide a process for the aqueous emulsion or granular polymerization of vinyl acetate to produce a polyvinyl acetate of relatively low viscosity.

It is another object of this invention to provide a process for the aqueous emulsion or granular polymerization of vinyl acetate which will substantially completely polymerize the vinyl acetate to produce a polyvinyl acetate having a viscosity of less than 700 centipoises.

It is another object of this invention to provide a process for the aqueous emulsion or granular polymerization of vinyl acetate which will substantially completely polymerize the vinyl acetate to produce a polyvinyl acetate having a viscosity of less than 700 centipoises, and which may be hydrolyzed to produce a polyvinyl alcohol having a viscosity greater than about 35 centipoises.

It is still another object of this invention to provide a process for the aqueous emulsion or granular polymerization of vinyl acetate which will substantially completely polymerize the vinyl acetate having a viscosity of less than 700 centipoises, and preferably less than 400 centipoises, and which may be hydrolyzed to produce a polyvinyl alcohol having a viscosity substantially as high as polyvinyl alcohol similarly prepared from high viscosity polyvinyl acetate.

The above objects may be accomplished by adding a small amount of an aliphatic or aromatic aliphatic ketone having not more than 10 carbon atoms to an aqueous vinyl acetate emulsion prior to the emulsion polymerization thereof, or during the polymerization but before reaching 60% completion of polymerization, and then carrying out the emulsion polymerization at a temperature of about 65° C. to 95° C. in any conventional manner.

If it is desired to prepare a polyvinyl acetate which may be hydrolyzed to polyvinyl alcohol having a viscosity greater than 35 centipoises, the emulsion or granular polymerization process is preferably carried out by the batch process with the temperature gradually increased to maintain reflux of the reaction mass, i. e., at a temperature varying from an initial temperature of the order of 50° C. or 60° C. to a final temperature of the order of 80° C. to 100° C.

This invention is restricted to the polymerization of a polymerizable monomer in an aqueous emulsion in which the polymerizable monomer consists entirely of vinyl acetate, or in which the monomer is comprised of such a predominating amount of vinyl acetate (95% or more) that the monomeric polymerizable composition has substantially the character of an aqueous emulsion of vinyl acetate, and the resulting polymer has the character of polymerized vinyl acetate.

The invention is further restricted to the aqueous emulsion or granular polymerization of the vinyl acetate, i. e., the polymerization of vinyl acetate monomer in a water emulsion or dispersion containing at least 30% water, a small amount of a polymerization catalyst, and an emulsifying agent. Although attempts have been made to differentiate between granular and emulsion polymerization, this distinction represents mainly a difference in particle size as obtained by the use of different emulsifying or dispersing agents. Inasmuch as the polymerization of vinyl acetate in accordance with the present invention can be carried out equally well with either process, they will be considered equivalent and will be generally referred to as emulsion polymerization processes throughout the specification and claims. Any of the known emulsifying agents used in granular or emulsion polymerization can be used in carrying out the principles of the present invention, for example, gelatin, polyvinyl alcohol, organic sulfates, organic sulfonates, salts of sulfonated oils, and the like.

The process of this invention may be carried out with the use of any of the commonly used emulsion polymerization catalysts, for example, organic peroxides, such as benzoyl peroxide or lauryl peroxide, inorganic peroxides, such as hydrogen peroxide and sodium peroxide, per acid salts, such as persulfates, perborates, and percarbonates.

As above stated, the viscosity of the polymerized vinyl acetate is modified (made lower) by the presence in the polymerizable monomeric emulsion of an aliphatic or aliphatic aromatic ketone having not more than 10 carbon atoms. For example, the following aliphatic ketones may be used: acetone, propenone, butanone, pentanone, heptanone, tertiary butyl methyl ketone, and diketones such as diacetyl, acetylacetone, and acetonylacetone. The following are examples of aliphatic aromatic ketones which may be used: methyl phenyl ketone and ethyl phenyl ketone.

The quantity of the viscosity-modifying ketone used to produce the effect of lowering the viscosity of the resulting polyvinyl acetate may be varied between fairly wide limits. Preferably, the ketone viscosity-modifying agent is used in an amount between 0.01% and 10.0%, based on the weight of the vinyl acetate in the emulsion. However, even slight traces of the ketone will be operative to lower the viscosity of the polyvinyl acetate, and amounts slightly greater than 10% can, under some circumstances, be used without ill effect.

The emulsion polymerization of the vinyl acetate is preferably carried out to substantial completion, i. e., 93% to 99% complete, in order to obtain the desired quality of polyvinyl alcohol in such cases in which the polyvinyl acetate is to be hydrolyzed for the production of polyvinyl alcohol. Considerable improvement in lower viscosity of the resulting polyvinyl acetate can, however, be obtained even though the polymerization is only carried out to partial completion. It is known that vinyl acetate can be incompletely polymerized, e. g., 60% to 75% complete, by a conventional emulsion polymerization process to produce a relatively low viscosity polyvinyl acetate and that such incompletely polymerized polyvinyl acetate will produce a somewhat higher viscosity polyvinyl alcohol upon hydrolysis; however, such a process is not only inefficient in polymerizing only a portion of the monomer, but produces a polyvinyl alcohol which has a higher molecular weight but which is for many purposes inferior and undesirable. By the process of the present invention in which the polymerization is carried out in the presence of a ketone, whether or not the polymerization is carried out to substantial completion, a polyvinyl acetate of satisfactory chain length is produced which in turn will produce, by hydrolysis, a polyvinyl alcohol of relatively high viscosity and molecular weight. It is, however, preferred to carry out the polymerization to substantial completion since the polyvinyl acetate produced thereby can be hydrolyzed to form a greatly superior polyvinyl alcohol. Heretofore, when employing an aqueous emulsion polymerization process for the production of polyvinyl acetate which was suitable for the production, by hydrolysis, of a polyvinyl alcohol having a relatively high viscosity, e. g., a viscosity of over 35 centipoises, it was considered necessary to first polymerize the vinyl acetate to substantial completion which produces a polyvinyl acetate having a viscosity of over 1000 centipoises. By the present process, the vinyl acetate can be polymerized to substantial completion to produce a polyvinyl acetate having a viscosity of less than 700 centipoises and usually less than 400 centipoises, but which to our surprise, when hydrolyzed, will produce polyvinyl alcohol having a viscosity of over 35 centipoises.

The following examples showing certain preferred methods of practicing the process of the present invention are given to more clearly illustrate the features of the present invention. It is to be understood, however, that the invention is not limited to the specific details of the examples. (Examples I and II illustrate the emulsion polymerization in the absence of a ketone viscosity modifying agent, and Examples III to V show, by comparison, similar processes in which such ketone viscosity modifying agents have been added in accordance with the present invention.)

*Example I*

In a one-liter, three-necked, polymerization flask provided with a sealed stirrer, thermometer well, and reflux condenser were placed 375 parts of vinyl acetate, 360 parts of water, and one part of a 6% aqueous solution of polyvinyl alcohol having a saponification number of between 127 and 157. The flask was placed in a water bath and was heated to 40° C., and 10 parts of a 2% aqueous sodium bicarbonate solution (pH of 8.3) and 1.5 parts of 3% aqueous solution of hydrogen peroxide was added. The temperature was increased to reflux and the bath temperature was gradually increased so as to maintain reflux (63° C.–94° C.). After five hours and forty minutes, 99% of the vinyl acetate had polymerized and the residual vinyl acetate was steamed from the flask. The material was cooled and the beads of polymer were filtered and washed with distilled water. A molar benzene solution of the polymer had a viscosity of 1170 centipoises at 20° C. The polyvinyl acetate was hydrolyzed in a known manner by dissolving the same in methanol, adding a dilute solution of sodium methylate in methanol as the catalyst and adding acetic acid to neutralize the solution. This general process is disclosed in the following United States Patents: 2,109,883, 2,227,997, 2,266,966, 2,194,354, and 2,127,135.

*Example II*

This example shows the use of diphenylamine to stop a polymerization at about 95% completion. A procedure quite similar to that outlined in Example I was followed. At the end of three hours and forty-five minutes, 95% of the vinyl acetate was polymerized. A small amount of diphenylamine, 1% by weight of the mass, was then added. This serves to prevent further polymerization during the steaming operation. The residual vinyl acetate was then removed by steam distillation and the polymer was isolated. The molar benzene solution had a viscosity of 1700 centipoises at 200° C. Polyvinyl alcohol, obtained from this polyester, gave a viscosity of 76.5 centipoises for a 4% aqueous solution at 20° C.

Example III

This example illustrates the use of acetone as a polymerization modifying agent. A procedure similar to that outlined in Example I was followed except that 3.75 parts of acetone was added to the emulsion before initiating polymerization. After seven hours, the polymerization was 97% complete. The material was cooled and the polymer was separated. A molar benzene solution of the dry polyvinyl acetate had a viscosity of 682 centipoises at 20° C. The polyvinyl acetate was converted to polyvinyl alcohol using the procedure outlined in Example I. A 4% aqueous solution of the polyvinyl alcohol had a viscosity of 53 centipoises at 20° C.

Example IV

This example illustrates the use of methyl ethyl ketone as a polymerization modifying agent. The procedure in Example III was used except that 1.89 parts of methyl ethyl ketone was used instead of acetone. The polymerization was 97% complete in five hours and thirty minutes. Polyvinyl acetate having a viscosity of 282 centipoises was obtained. This acetate on hydrolysis gave a 47.6 centipoises polyvinyl alcohol.

Example V

This example shows the effect of using methyl ethyl ketone as polymerization modifying agent and inhibiting the polymerization before steaming. The procedure outlined in Example IV was used except that 4.6 parts of methyl ethyl ketone was used and diphenylamine, as in Example II, was added to stop the polymerization before steaming. After three hours and thirty-five minutes, the polymerization was 93% complete. A molar benzene solution of the polyvinyl acetate had a viscosity of 131 centipoises. Polyvinyl alcohol derived from this acetate had a viscosity of 34 centipoises.

Reference in the specification and claims to parts, proportions, and percentages, unless otherwise specified, refers to parts, proportions, and percentages by weight.

Since it is obvious that many changes and modifications can be made in the above-described details without departing from the nature and spirit of the invention, it is to be understood that the invention is not to be limited to said details except as set forth in the appended claims.

What is claimed is:

1. In a process for the aqueous emulsion polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of a ketone consisting of hydrocarbon and carbonyl groups taken from the group consisting of aliphatic ketones and aliphatic aromatic ketones containing not more than 10 carbon atoms, and polymerizing said monomer at a temperature between 50° C. and 100° C.

2. In a process for the aqueous emulsion polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of a ketone consisting of hydrocarbon and carbonyl groups taken from the group consisting of aliphatic ketones and aliphatic aromatic ketones containing not more than 10 carbon atoms, and polymerizing said monomer at a temperature between 50° C. and 100° C. to at least 93% completion.

3. In a process for the aqueous emulsion polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of an aliphatic ketone containing not more than 10 carbon atoms and consisting of hydrocarbon and carbonyl groups, and polymerizing said monomer at a temperature between 50° C. and 100° C. to at least 93% completion.

4. In a process for the aqueous polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of an aliphatic aromatic ketone containing not more than 10 carbon atoms and consisting of hydrocarbon and carbonyl groups, and polymerizing said monomer at a temperature between 50° C. and 100° C. to at least 93% completion.

5. In a process for the aqueous polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of acetone, and polymerizing said monomer at a temperature between 50° C. and 100° C. to at least 93% completion.

6. In a process for the aqueous polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of methyl phenyl ketone, and polymerizing said monomer at a temperature between 50° C. and 100° C. to at least 93% completion.

7. In a process for the aqueous polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of a ketone consisting of hydrocarbon and carbonyl groups taken from the group consisting of aliphatic ketones and aliphatic aromatic ketones containing not more than 10 carbon atoms, and polymerizing said monomer by a batch polymerization process with the temperature gradually increased to maintain the reaction mass under reflux from about 50 C. to 60° C. to about 80° C. to 100° C., said polymerization being carried out to at least 93% completion.

8. In a process for the aqueous polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of an aliphatic ketone containing not more than 10 carbon atoms and consisting of hydrocarbon and carbonyl groups, and polymerizing said monomer by a batch polymerization process with the temperature gradually increased to maintain the reaction mass under reflux from about 50° C. to 60° C. to about 80° C. to 100° C., said polymerization being carried out to at least 93% completion.

9. In a process for the aqueous polymerization of vinyl acetate, the steps comprising adding to an aqueous polymerizable emulsion, in which vinyl acetate comprises at least 95% of the polymerizable monomer, between 0.01% and 10%, based on the weight of the vinyl acetate, of an aliphatic aromatic ketone containing not more than 10 carbon atoms and consisting of hydrocarbon and carbonyl groups, and polymerizing said monomer by a batch polymerization process with the temperature gradually increased to maintain the reaction mass under reflux from about 50° C. to 60° C. to about 80° C. to 100° C. said polymerization being carried out to at least 93% completion.

WILLIAM R. CORNTHWAITE.
HAROLD W. BRYANT.

REFERENCES CITED

The following references are of record in the file of this patent:

UNITED STATES PATENTS

| Number | Name | Date |
|---|---|---|
| 2,118,864 | Reppe et al. | May 31, 1938 |
| 2,367,661 | Agre | Jan. 23, 1945 |